(12) United States Patent
Kapadia et al.

(10) Patent No.: US 7,853,541 B1
(45) Date of Patent: Dec. 14, 2010

(54) METHOD AND APPARATUS FOR SIMMERED GREEDY OPTIMIZATION

(75) Inventors: Sadik Kapadia, Santa Clara, CA (US); Richard Rohwer, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 671 days.

(21) Appl. No.: 11/845,318

(22) Filed: Aug. 27, 2007

Related U.S. Application Data

(60) Provisional application No. 60/823,621, filed on Aug. 25, 2006.

(51) Int. Cl.
*G06F 15/18* (2006.01)

(52) U.S. Cl. .................................................. 706/14
(58) Field of Classification Search .................. 706/14
See application file for complete search history.

(56) References Cited

U.S. PATENT DOCUMENTS

| 5,745,735 A | * | 4/1998 | Cohn et al. ............... 703/6 |
| 6,453,245 B1 | * | 9/2002 | Rothberg et al. .......... 702/20 |
| 2005/0187711 A1 | * | 8/2005 | Agrawala et al. ......... 701/211 |

* cited by examiner

*Primary Examiner*—Donald Sparks
*Assistant Examiner*—Vincent M Gonzales
(74) *Attorney, Agent, or Firm*—Mintz, Levin, Cohn, Ferris, Glovsky and Popeo, P.C.

(57) ABSTRACT

A method and apparatus comprising a fast and highly effective stochastic algorithm, referred to as Simmered Greedy Optimization (SG(N)), for solving combinatorial optimization problems, including the co-clustering problem comprising simultaneously clustering two finite sets by maximizing the mutual information between the clusterings and deriving maximally predictive feature sets. Co-clustering has found application in many areas, particularly statistical natural language processing and bio-informatics. Provided are results of tests on a suite of statistical natural language problems comparing SG(N) with simulated annealing and a publicly available implementation of co-clustering, wherein using SG(N) provided superior results with far less computation.

20 Claims, 8 Drawing Sheets

```
00: Inputs:
01:     Initial seed partitioning.
02:     Shortlist length - N
03: Temp = Infinity
04: Repeat
05:     For current object = first object, ..., last object
06:         Create shortlist of size N of best partitions by moving current object
                                                          to all other partitions.
07:         Randomly pick a partition from top N.
08:         If (E_{after}>E_{before})
09:             Accept new partitioning.
10:         Else
11:             Use probabilistic acceptance function, P= exp((E_{after}-E_{before})/T)
12:         EndIf
13:     EndFor
14:     Temp= Calculate next temperature
15: Until Converged
```

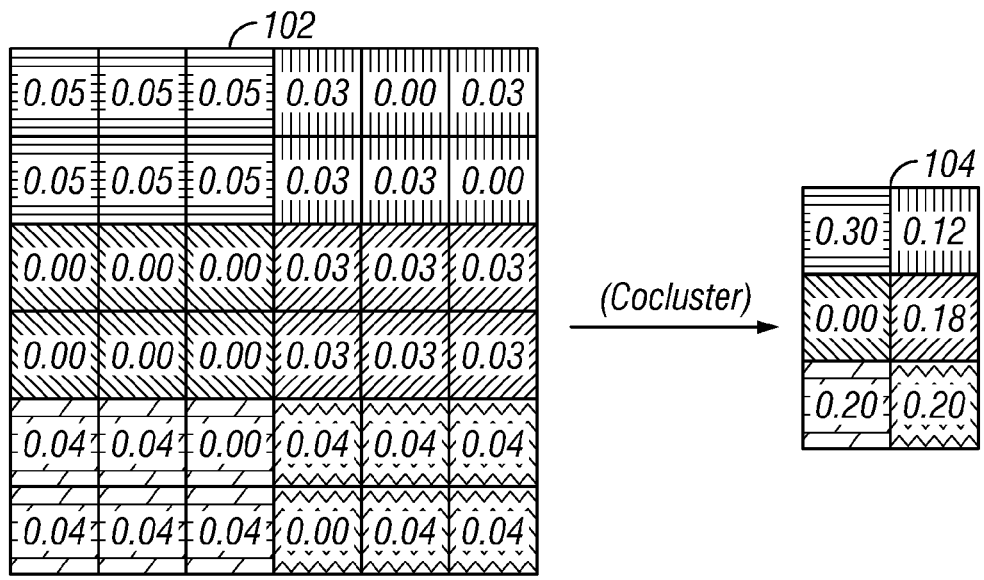

FIG. 1
*(Prior Art)*

```
00: Inputs:
01:     Initial seed partitioning.
02: Convergence tolerance.
03: Repeat
04:     For current object = first object, ..., last object
05:         Find the best partitioning among those produced by moving current
                                        object to all other partitions.
06:         If (objective function increases)
07:             Accept new partitioning.
08:         EndIf
09:     EndFor
10: Until objective function value increased by less than convergence tolerance
```

FIG. 2
*(Prior Art)*

```
00: Inputs:
01:     Initial seed partitioning.
02:     Annealing schedule - Temp1, ..., TempEnd
03:     Number of iterations at each temperature - NTemp
04: For T = Temp1 to TempEnd
05:     For It = 1 to NTemp
06:         Randomly pick an object.
07:         Randomly pick a partition.
08:         Compute objective function value after moving object to cluster, E_{after}
09:         If (E_{after}>E_{before})
10:             Accept new partitioning.
11:         Else
12:             Use probabilistic acceptance function, P = exp((E_{after}-E_{before})/T)
13:         EndIf
14:     EndFor
15: EndFor
```

FIG. 3

*(Prior Art)*

```
00: Inputs:
01:     Initial seed partitioning.
02:     Shortlist length - N
03: Temp = Infinity
04: Repeat
05:     For current object = first object, ..., last object
06:         Create shortlist of size N of best partitions by moving current object
                                                          to all other partitions.
07:         Randomly pick a partition from top N.
08:         If (E_{after}>E_{before})
09:             Accept new partitioning.
10:         Else
11:             Use probabilistic acceptance function, P= exp((E_{after}-E_{before})/T)
12:         EndIf
13:     EndFor
14:     Temp= Calculate next temperature
15: Until Converged
```

FIG. 4

| ID | Rows | Cols | Non-zero | Source |
|---|---|---|---|---|
| 00 | 1000 | 1000 | 152792 | Reuters-21578. See (Lewis, 1992) |
| 01 | 5000 | 5000 | 318896 | Declassified cables scraped from www.gulflink.osd.mil in 2005 |
| 02 | 5000 | 5000 | 374265 | Wall Street Journal portion of Penn Treebank corpus |
| 03 | 1000 | 1000 | 404010 | Wall Street Journal portion of North American News corpus |
| 04 | 5000 | 5000 | 521439 | Reuters-21578. See (Lewis, 1992) |
| 05 | 5000 | 5000 | 1023745 | Scraped from www.paknews.com in 2005 |
| 06 | 5000 | 5000 | 1521496 | German-language edition of Wikipedia scraped in 2005 |
| 07 | 5000 | 5000 | 2396651 | Wall Street Journal portion of North American News corpus |
| 08 | 91391 | 181718 | 2692256 | Scraped from www.paknews.com in 2005 |
| 09 | 5000 | 5000 | 2717041 | Arabic Newswire A from LDC |
| 10 | 5000 | 5000 | 3231494 | English-language edition of Wikipedia scraped in 2005 |
| 11 | 235483 | 468747 | 9220282 | Wall Street Journal portion of North American News corpus |
| 12 | 113301 | 146455 | 24135628 | Mixture of ww.paknews.com and Foreign Broadcast Information Service data |
| 13 | 1080756 | 299519 | 12517317 | English-language edition of Wikipedia scraped in 2005 |
| 14 | 13077 | 116647 | 2063631 | 20 newsgroups corpora. See (Eick et al., 2006) |

*(Table 1)*

FIG. 5

| ID | SG(1) bits | SG(1) loops | GR(20) bits | GR(20) loops |
|----|-----------|-------------|-------------|--------------|
| 00 | 2.190467 | 44 | 2.184482 | 199 |
| 01 | 2.006277 | 62 | 1.981617 | 336 |
| 02 | 1.873641 | 66 | 1.853707 | 335 |
| 03 | 1.846059 | 45 | 1.840741 | 182 |
| 04 | 2.042700 | 63 | 2.022561 | 314 |
| 05 | 1.987687 | 59 | 1.972001 | 289 |
| 06 | 1.827839 | 57 | 1.819024 | 253 |
| 07 | 1.699905 | 60 | 1.687273 | 314 |
| 08 | 1.966028 | 92 | 1.930724 | 338 |
| 09 | 2.771656 | 58 | 2.736674 | 285 |
| 10 | 1.977875 | 58 | 1.970078 | 291 |
| 11 | 1.677183 | 105 | 1.650067 | 351 |
| 12 | 0.316051 | 66 | 0.311520 | 766 |
| 13 | 1.100427 | 91 | 0.971542 | 456 |
| 14 | 1.169976 | 88 | 1.115999 | 647 |

(Table 2)

| ID | Decay 0.9375 | | Decay 0.8750 | | Decay 0.7500 | | Decay 0.5000 | |
|----|------|-------|------|-------|------|-------|------|-------|
|    | Bits | Loops | Bits | Loops | Bits | Loops | Bits | Loops |
| 00 | 2.190910 | 76  | 2.190368 | 37 | 2.188618 | 19 | 2.185574 | 17 |
| 01 | 2.009327 | 105 | 2.006812 | 51 | 2.003946 | 25 | 1.997800 | 13 |
| 02 | 1.874273 | 92  | 1.873557 | 44 | 1.871209 | 22 | 1.864048 | 12 |
| 03 | 1.845974 | 67  | 1.845654 | 32 | 1.844937 | 17 | 1.843619 | 18 |
| 04 | 2.042357 | 105 | 2.042389 | 51 | 2.036862 | 25 | 2.034460 | 13 |
| 05 | 1.988385 | 106 | 1.986686 | 51 | 1.984308 | 25 | 1.980605 | 13 |
| 06 | 1.828661 | 91  | 1.829064 | 44 | 1.825953 | 22 | 1.823831 | 12 |
| 07 | 1.702156 | 100 | 1.700298 | 48 | 1.696639 | 24 | 1.693860 | 13 |
| 08 | 1.968882 | 166 | 1.966471 | 77 | 1.963348 | 36 | 1.950102 | 17 |
| 09 | 2.775000 | 96  | 2.769198 | 47 | 2.766189 | 24 | 2.754700 | 13 |
| 10 | 1.979898 | 92  | 1.979175 | 44 | 1.976908 | 22 | 1.974134 | 12 |
| 11 | 1.681316 | 172 | 1.679304 | 79 | 1.673851 | 36 | 1.666400 | 16 |
| 12 | 0.315931 | 108 | 0.314867 | 51 | 0.313373 | 25 | 0.311446 | 13 |
| 13 | 1.072808 | 150 | 1.067058 | 73 | 1.061384 | 36 | 1.044208 | 18 |
| 14 | 1.180147 | 151 | 1.173282 | 73 | 1.167679 | 35 | 1.153686 | 18 |

(Table 3)

| ID | SG(1) bits | SG(2) bits | SG(4) bits | SG(∞) bits |
|---|---|---|---|---|
| 00 | 2.189635 | 2.188863 | 2.186789 | 2.180184 |
| 01 | 2.008667 | 2.004791 | 1.997793 | 1.974783 |
| 02 | 1.872126 | 1.869315 | 1.863943 | 1.848111 |
| 03 | 1.846134 | 1.845608 | 1.844361 | 1.836537 |
| 04 | 2.042377 | 2.040460 | 2.033128 | 2.015460 |
| 05 | 1.986996 | 1.984876 | 1.980025 | 1.966662 |
| 06 | 1.828287 | 1.826696 | 1.824220 | 1.814148 |
| 07 | 1.700046 | 1.697941 | 1.693162 | 1.684666 |
| 08 | 1.967601 | 1.966252 | 1.955081 | 1.925802 |
| 09 | 2.771441 | 2.764992 | 2.756185 | 2.729259 |
| 10 | 1.979390 | 1.977776 | 1.976482 | 1.966687 |
| 11 | 1.679866 | 1.676595 | 1.668961 | 1.649956 |
| 12 | 0.316916 | 0.315730 | 0.313491 | 0.304052 |
| 13 | 1.076731 | 1.086433 | 1.094603 | 1.005044 |
| 14 | 1.175882 | 1.172515 | 1.164393 | 1.115606 |

(Table 4)

| ID | SG(1) bits | SG(1) Time | ISD(0) bits | ISD(0) Time | ISD(1) bits | ISD(1) Time | ISD(40) bits | ISD(40) Time | ISD(400) bits | ISD(400) Time |
|---|---|---|---|---|---|---|---|---|---|---|
| 00 | 2.1896 | 0m15.6s | 1.7683 | 0m3.3s | 2.1742 | 116m43s | 2.1816 | 168m55s | 2.1814 | 419m16s |
| 01 | 2.0086 | 1m47.4s | 1.4913 | 0m32.1s | 1.9350 | 754m55s | 1.9810 | 1995m | 1.9810 | 5461m |
| 02 | 1.8721 | 1m29.3s | 1.3427 | 0m41.2s | 1.8120 | 694m0s | 1.8541 | 2161m | 1.8556 | 4829m |
| 03 | 1.8461 | 0m16.9s | 1.6654 | 0m16.3s | 1.8320 | 100m0s | 1.8380 | 163m0s | 1.8421 | 502m4s |
| 04 | 2.0423 | 2m0.0s | 1.6328 | 1m20.5s | 1.9830 | 766m29s | 2.0177 | 1963m | 2.0230 | 4397m |
| 05 | 1.9869 | 2m6.4s | 1.7051 | 2m34.1s | 1.9377 | 685m31s | 1.9695 | 1780m | 1.9698 | 4451m |
| 06 | 1.8282 | 2m32.5s | 1.5502 | 4m26.2s | 1.8077 | 684m26s | 1.8167 | 1313m | 1.8202 | 3568m |
| 07 | 1.7000 | 2m48.8s | 1.5277 | 10m22s | 1.6674 | 694m16s | 1.6868 | 1588m | 1.6864 | 4282m |
| 08 | 1.9676 | 84m4.2s | 1.7253 | 170m33s | | | | | | |
| 09 | 2.7714 | 2m40.2s | 2.3987 | 10m38s | 2.6882 | 990m2s | 2.7191 | 1646m | 2.7364 | 4671m |
| 10 | 1.9793 | 2m58.8s | 1.7553 | 11m35s | 1.9559 | 701m12s | 1.9687 | 1555m | 1.9692 | 3880m |
| 11 | 1.6798 | 310m33s | 1.4670 | 1258m6s | | | | | | |
| 12 | 0.3169 | 59m6s | 0.2915 | 384m33s | | | | | | |
| 13 | 1.0767 | 546m52s | 0.8927 | 6383m | | | | | | |
| 14 | 1.1758 | 36m44s | 0.9561 | 30m1s | | | | | | |

(Table 5)

FIG. 12

| ID | GR(1) bits | ISD(0) bits |
|---|---|---|
| 00 | 2.182290 | 1.768326 |
| 01 | 1.972900 | 1.491379 |
| 02 | 1.847596 | 1.342751 |
| 03 | 1.838732 | 1.665433 |
| 04 | 2.019240 | 1.632847 |
| 05 | 1.965233 | 1.705101 |
| 06 | 1.816051 | 1.550272 |
| 07 | 1.684545 | 1.527742 |
| 08 | 1.927110 | 1.725376 |
| 09 | 2.729193 | 2.398738 |
| 10 | 1.964476 | 1.755337 |
| 11 | 1.645859 | 1.467043 |
| 12 | 0.310182 | 0.291539 |
| 13 | 0.962027 | 0.892727 |
| 14 | 1.107422 | 0.956123 |

(Table 6)

METHOD AND APPARATUS FOR SIMMERED GREEDY OPTIMIZATION

CROSS-REFERENCE TO RELATED APPLICATIONS

The present application claims priority to related provisional patent application Ser. No. 60/823,621 filed Aug. 25, 2006, entitled "Method and Apparatus for Simmered Greedy Optimization," by inventors Richard Rohwer and Sadik Kapadia, which is not admitted to be prior art with respect to the present invention by its mention in the background. This application is incorporated herein in its entirety by this reference thereto.

BACKGROUND OF THE INVENTION

1. Technical Field

The invention relates to the analysis of information on a computer network. More particularly, the invention relates to a method and apparatus for efficiently solving combinatorial optimization problems on a computer network.

2. Description of the Related Art

There exists continued interest in developing more effective approaches for processing combinatorial optimization problems. Likewise, there is much interest in developing computationally efficient methods for solving co-clustering problems, a special type of combinatorial optimization problem, or even more generally, other classes of problems that involve search through extremely large sets. The co-clustering problem involves simultaneously clustering two finite sets by maximizing the mutual information between the clusterings. Co-clustering has found application in many areas, particularly statistical natural language processing and bio-informatics, among others.

Co-clustering is the problem of clustering the possible values of two variables, such as the input and target variables of a prediction problem, so that the clusters are maximally predictive of each other. For example, terms and documents may be clustered to produce groups of terms that characterize groups of documents. Active genes detected in microarray experiments can be co-clustered with environmental conditions in which they are clarifying the relationship between the two.

Co-clustering maximizes mutual information between the clusterings. This implies that when co-clustering is restricted to the special case of clustering the possible values of a single variable, the resulting clusters form a maximally predictive feature set of any given cardinality for predicting the second variable. Simultaneously clustering the second variable is often of interest in its own right; e.g., for summarizing the relationship between the two variables, but even when it is not, co-clustering is usually much faster computationally than ordinary clustering, and produces similar results for the variable of interest.

Given the explosion of data and the need for processing that data, It would be advantageous to provide a fast, yet highly effective and efficient method for operation on a computer network for solving combinatorial optimization problems, including the co-clustering problem.

It further would be advantageous to provide such a method comprising an algorithm on a computer network for solving the generalized combinatorial optimization problem as well as the co-clustering problem, where the results of the process are superior and require significantly fewer computations than other solutions, including, the greedy optimization process, i.e., "GR," the simulated annealing process, i.e., "SA," and another algorithmic solution by Dhillon et al directed to co-clustering, i.e., "DC".

SUMMARY OF THE INVENTION

The invention is a method and apparatus comprising a fast and highly effective stochastic algorithm, hereinafter referred to as Simmered Greedy Optimization, i.e., "SG(N)," for solving combinatorial optimization problems and, for illustrative purposes herein, the co-clustering problem. In co-clustering, two finite sets are simultaneously clustered to maximize the mutual information between the clusterings. The co-clustering problem is a combinatorial optimization problem for deriving maximally predictive feature sets. Co-clustering has found applications in many areas, particularly statistical natural language processing and bio-informatics. The superior utility of a preferred embodiment of the invention has been established via various tests on a suite of statistical natural language problems comparing SG(N) with both SA and DC. As is shown in the associated charts and graphs, in a presently preferred embodiment of the invention, SG(N), provided significantly superior performance with far less computation. The computational requirements were at least three orders of magnitude less for SG(N).

BRIEF DESCRIPTION OF THE DRAWINGS

FIG. 1 illustrates the operation of the co-clustering concept according to the prior art;

FIG. 2 presents pseudo-code for the GR optimization process according to the prior art;

FIG. 3 presents pseudo-code for the SA process according to the prior art;

FIG. 4 presents pseudo code for SG(N), according to a preferred embodiment of the invention;

FIG. 5 shows a table of co-occurrence matrices used in evaluations according to the invention;

FIG. 12 shows a table of run times and mutual information achieved by SG(1) and DC, according to the invention;

DETAILED DESCRIPTION OF THE INVENTION

Figures 6, 7:
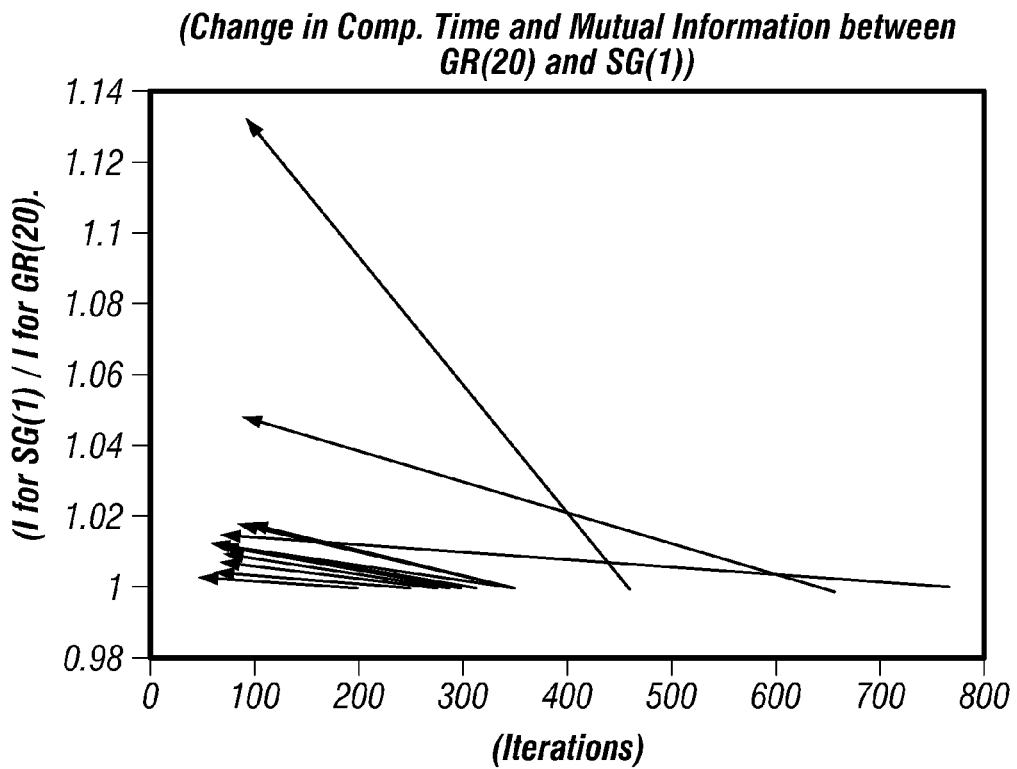
FIG. 6 shows a table of the benchmark of SG(1) against the GR process with 20 random restarts, i.e, "GR(20)," according to the invention.
FIG. 7 is a graph showing relative change in mutual information/achieved by using SG(1) in place of GR(20), according to the invention.

A method and apparatus comprising a fast and highly effective stochastic algorithm, referred to as Simmered Greedy Optimization, i.e., "SG(N)," for solving combinatorial optimization problems. For illustrative purposes, the invention is described in reference to a co-clustering problem to simultaneously cluster two finite sets by maximizing the mutual information between the clusterings, is provided. The co-clustering problem is a combinatorial optimization problem of great interest for deriving maximally predictive feature sets. Clustering one finite set by this criterion is a special case and application of the invention. Co-clustering has found applications in many areas, particularly statistical natural language processing and bio-informatics. Provided are results of tests on a suite of statistical natural language problems comparing SG(N) with SA and DC, wherein using SG(N) provided superior results with far less computation.

Introduction

The general applicability and optimality of co-clustering comes at a cost: it is a combinatorial optimization problem involving a search through the possible clusterings of the two variables. To date, no methods for solving such problems are both feasible and rigorous, so the best one can do is to resort to rigorous algorithms such as Simulated Annealing, i.e., "SA," modified by heuristics such as accelerated annealing schedules, to help move the algorithmic processes toward computational feasibility.

One embodiment of the invention, comprising the Simmered Greedy, i.e., "SG(N)," algorithm, preserves the advantages of both SA and GR while largely avoiding their disadvantages. The results of the work disclosed herein have shown that, in comparison to other methods, SG(N) has consistently reduced computation time by around three orders of magnitude while also producing better solutions. Consequently, SG(N) can be applied to solve larger-scale problems than were previously unapproachable. Although the optimization method of the invention is described in the context of co-clustering problems, it should be appreciated that the method can be usefully adapted to many other classes of problems that involve searching through extremely large data sets.

In a more general application to a combinatorial optimization problem, the invention comprises a tangibly embodied machine-readable medium operable to cause one or more machines to result in operations comprising: arranging objects into candidate solutions for an identified problem; constructing a shortlist of candidate solutions from a predetermined number of highest scoring possible candidate solutions at the current optimization stage for a current object; picking randomly a candidate solution from said shortlist of candidate solutions; determining if an application of said candidate solutions is acceptable according to a probabilistic acceptance criteria at a current temperature and gradually decreasing said current temperature; replacing a current candidate solution with said picked candidate solution, if said picked candidate solution is acceptable; repeating iteratively the picking, determining, and replacing step until no acceptable candidate solutions from said shortlist of candidate solutions remain; establishing said current candidate solution as an output candidate solution wherein said output candidate solution has a high confidence level of having a maximum of utility for solving said identified problem; and, outputting said output candidate solution for display to a user. The above method significantly reduces the time required to compute an output candidate with maximum utility to the user for the identified problem under investigation or analysis.

In a co-clustering application, the invention is an article comprising a tangibly embodied machine-readable medium operable to cause one or more machines to result in operations comprising arranging objects which are, realizations of two variables into a current clustering; constructing a shortlist of destination clusters of a predetermined size, N, containing highest scoring destination clusters for a current object; picking randomly a destination cluster from said shortlist of destination clusters; determining if said picked destination cluster is acceptable according to a probabilistic acceptance criteria at a current temperature, T, gradually decreasing said current temperature, T; replacing said current clustering with said picked destination clustering, if said picked destination clustering is acceptable; repeating iteratively the picking, determining, and replacing steps until no acceptable destination clusters from said shortlist of destination clusters remain; establishing said current clustering of objects as an output clustering wherein said output clustering has a high confidence level of having a maximum of mutual information between said variables for predicting relationships between said variables; and, outputting said output clustering for display to a user to solve the problem based on maximally predictive feature sets. Again, the method of the invention greatly accelerates the process of locating an output clustering, or solution, for a current problem, which is of utility to the user engaged in solving or analyzing the problem.

To effectively understand the basis of the invention, it also helpful to also review related art associated with the co-clustering problem. Three prior art combinatorial optimization algorithms: Greedy Optimization, i.e., "GR," Simulated Annealing, i.e., "SA," and an algorithm designed by Dhillon et al, i.e., "DC," for co-clustering are discussed in detail. One embodiment of the Simmered Greedy Optimization (SG(N)) invention combines the best features of GR and SA and is provided herein. Also discussed is an empirical investigation of the runtime, solution quality, and scalability of these algorithms in comparison to the invention.

The Co-Clustering Problem

In a co-clustering problem one begins with two variables, t and d, each of which can assume a finite number (T and D) of values designated as $t_1, \ldots, t_T$ and $d_1, \ldots, d_D$, respectively. Each pair of values $(t_i, d_j)$ has an associated number count $N(t_i, d_j)$ from which one can form the maximum likelihood estimate of their joint probability $P(t_i, d_j) = N(t_i, d_j)/N$ where $N = \Sigma_{ij} N(t_i, d_j)$, with the sums ranging over all possible values. Herein, $P(t=t_i, d=d_j)$ is abbreviated by $P(t_i, d_j)$, and similarly for the marginal distributions $P(t=t_i) = P(t_i) = \Sigma_j P(t_i, d_j)$ and $P(d=d_j) = P(d_j) = \Sigma_i P(t_i, d_j)$. It should thus be appreciated that t and d are reserved names, i.e. not arbitrary values, of variables, serving to label the distribution or count in which they appear.

As a typical example, t can take values in the terms of some vocabulary, d can take values in a collection of documents, and $N(t_i, d_j)$ can be the number of times term $t_i$ appears in document $d_j$. If a document and a term from that document are drawn at random from distribution $P(t,d)$, and it is known which term was drawn, such conveys some information about the document that was drawn. The expected amount of information about the document that can be obtained upon learning a term, or vice versa, about a term from learning the identity of the document, is the mutual information of the joint distribution $$P(t, d) : I(t, d) = \sum_{ij} P(t_i, d_j) \log \frac{P(t_i, d_j)}{P(t_i) P(d_j)}.$$

A co-clustering is a pair of partitions, one for t and one for d. That is, the values of t are divided into a specified number R non-intersecting sets, with every value placed in exactly one set, and similarly the values of d are partitioned into C sets. A set within such a partition is referred to herein as a "cluster", with the clusters of t values called and the clusters of d values called $d_1, \ldots, d_c$. By summing the term-document counts N(t,d) within each pair of clusters, cluster-level counts N(r,c) are obtained. Again, t, d, r and c are variable names that label number counts and distributions, not dummy variables. From these counts the joint distribution over clusters can be estimated as P(r,c)=N(r,c)/N, resulting in mutual information $$I(r, c) = \sum_{ij} P(r_i, c_j) \log \frac{P(r_i, c_j)}{P(r_1)P(c_j)}.$$

The co-clustering problem is to maximize I(r,c) over all possible pairs of partitions into prescribed numbers of clusters R and C.

FIG. 1 illustrates the co-clustering concept according to the prior art. FIG. 1 shows co-clustering from a (6×6) raw probability matrix to a (3×2) clustered probability matrix. Referring to the matrix 102, the "terms," t, label the rows and the "documents," d, the columns of the matrix P(t,d) of joint probabilities. The rows are grouped into clusters r and the columns into clusters c indicated by textures. The probabilities are summed within the clusters, producing the distribution over clusters illustrated by the matrix 104. To the extent that particular terms tend to occur only in particular documents, the ability to predict one from the is not impacted by replacing the full matrix with the clustered matrix, because the clustering conflates only terms that come from the same documents, and similarly, the documents in a cluster all have the same terms. Maximization of mutual information achieves this effect to the greatest extent possible, given that clustering inevitably loses information (I(r,c)≦I(t,d)).

Co-clustering has a number of important applications including, among others:
 Unsupervised identification of anomalous events;
 Document classification;
 Gene expression analysis; and
 Initialization of supervised models.

The methods described above do not take advantage of any prior information about the semantics represented by the rows and columns of the co-occurrence matrix. The methods instead model the rows and columns indices as nominal identifiers. In domains where the row and column indexes have richer meaning, for instance ordinal, this information can be used to provide tailored implementations.

Optimization Algorithms

Co-clustering is a special case of a combinatorial optimization problem. Simple exhaustive enumeration would have to examine $T^R * D^C$ configurations, or very slightly fewer if partitions containing empty sets were disallowed, to find the global maximum. With usefully large values of T, R, D and C this is an impossibly high number, so one is forced to consider search algorithms that have a reasonable chance of finding a good sub-optimal solution.

Hereinbelow, the results on the four algorithms, Greedy Optimization (GR), Simulated Annealing (SA), the special-purpose co-clustering algorithm of Dhillon (DC) and the claimed Simmered Greedy (SG(N)) algorithm are presented.

Because of the row and column symmetry of co-clustering, GR, SA and DC algorithms proceed by alternately performing the same operations on columns as for rows. Therefore it suffices to describe only the row operations in detail. Each algorithm uses the same basic row operations: the clustering is changed by moving a value from one cluster to another, and this change is accepted or rejected according to criteria based on the change in the mutual information objective function or a closely related function.

Incremental Update of Mutual Information

In SG(N), the accept/reject decision is based on the change in the mutual information itself. It is not necessary to re-calculate I for every move, because the change can be expressed in terms of sums over the columns of the two affected rows only. This is much more efficient than a full re-computation of I, which would require a sum over the full co-occurrence matrix. To compute the change in I under changes to a single row, first observe that I can be written as H(c)−H(c|r) where $$I = \sum_{ij} P(r_i, c_j) \log\left(\frac{P(c_j \mid r_i)}{P(c_j)}\right) \tag{1}$$

$$= -\sum_j P(c_j) \log P(c_j) + \sum_i \sum_j P(r_i, c_j) \log P(c_j \mid r_i)$$

$$= H(c) - H(c \mid r). \tag{2}$$

so any increase in I can be regarded as a decrease in H(c|r), which is a simple sum $\Sigma_i H_i(c|r)$ of contributions $H_i(c|r)$ from each row:

$$H_i(c \mid r) = \sum_j P(r_i, c_j) \log P(c_j \mid r_i). \tag{3}$$

It is easy to work out that the change in $H_{ik}^{\pm}(c|r)$ in $H_i(c|r)$ upon inserting (+) or removing (−) value $t_k$ into (from) row cluster $r_i$, expressed in terms of raw counts, is $$H_{ik}^{\pm}(c \mid r) = \frac{1}{N} \sum_j (N(r_i, c_j) \pm N(t_k, c_j)) \log(N(r_i, c_j) \pm N(t_k, c_j)) - \tag{4}$$

$$\frac{1}{N}(N(r_i) \pm N(t_k)) \log(N(r_i) \pm N(t_k)) - H_i(c \mid r)$$

where $N(t_k, c_j) = \Sigma_{i \mid d_i \in c_j} N(t_k, d_i)$ is the number of times value $t_k$ co-occurs with a value in cluster $c_j$.

Expressing equation (4) in terms of raw number counts makes it clear that lookup tables for x log x at integer values of x can be used to avoid frequent re-computation of the logarithm at most values of the argument that appear in the computation. It has been found that this achieves speed-up by a factor of about five.

Look up tables also have the potential advantage that the mutual information measure can be altered with zero computational expense in order to reduce the effect of certain incorrect modeling assumptions. For instance observations in many sources are not multinominally distributed. Once a term occurs it is more likely to occur again. In this case the x log(x) entries can be replaced with another function [for instance (1.0+x)log(1.0+x)], that gives less marginal emphasis to multiply occurring terms.

Greedy Optimization (GR)

FIG. 2 presents pseudo-code for GR optimization. The GR optimization method replaces the current solution with another in the local neighborhood that is found to be locally better. Termination occurs when there is no better local solution.

The GR optimization method is fast because at each iteration, every increase in the objective function is accepted. However this method only converges to a local maximum. This limitation can be somewhat addressed by restarting GR from multiple random initial seeds and returning the best of these runs as the overall solution. Comparative co-clustering results from both simple GR and GR with random restarts are presented herein.

The Dhillon Algorithm (DC)

A variant of GR, the Dhillon or "DC" algorithm, was designed specifically for co-clustering. In this algorithm, one cycles through each point $t_k$ and assigns it to the cluster $r_i$ to which it is nearest in Kullback-Leibler (KL) divergence, i.e. the cluster $r_i$ for which $$D[P(c \mid t_k), P(c \mid r_i)] = \sum_j P(c_j \mid t_k) \log P(c_j \mid t_k) / P(c_j \mid r_i) \quad (5)$$

is minimal. One then updates the cluster-level counts and repeats, alternating between rows and columns as for all the algorithms, until the process converges.

The KL divergence (5) is closely related to the change in mutual information in equation (4), above. on which the other algorithms are based. The main difference between DC and GR is that DC updates the counts in one batch after determining all the row or column moves, whereas GR updates these counts on-line after every move.

A post-processing procedure may be added to the algorithm, where batch updates are replaced by a given number of on-line, or local updates, as in GR. Herein the batch algorithm is referred to as ISD(0) and the batch algorithm followed by N local updates is referred to as ISD(N).

Simulated Annealing (SA)

Stochastic search methods are required in order to seriously address the local minimum problem in a general setting. One such method is Simulated Annealing (SA). In this method, system states θ are randomly sampled under a sequence of Boltzmann distributions $$P_T(\theta) \alpha e^{-E(\theta)/T} \quad (6)$$

that become ever-more tightly concentrated on the minima of an arbitrary energy function E as the temperature parameter T is lowered toward zero. In the co-clustering problem, one takes the states to be the pair of cluster assignments and the energy to be E=−I, transforming the maximization problem into a minimization problem.

Given any Markov process for generating any state θ from any state θ with some nonzero probability q(θ'|θ) and given that q(θ|θ)=q(θ|θ), one can generate the Boltzmann distribution for energy E at temperature T=1, i.e. and therefore the Boltzmann distribution at any temperature by treating E/T as an energy at unit temperature, as the equilibrium distribution generated by accepting changes generated by q with probability $$1.0 \text{ if } dE \leq 0 \quad (7)$$

$$e^{-dE/T} \text{ if } dE > 0 \quad (8)$$

where dE is the increase in energy upon changing θ to θ'.

Simulated Annealing carries out this Markov Chain Monte Carlo (MCMC) sampling procedure in a quasi-stationary manner while varying the temperature from a high initial value that guarantees a nearly uniform Boltzmann distribution to zero, at which point all samples are taken from the state of lowest energy.

The pseudo-code for SA is presented in FIG. 3.

Given certain conditions on steps 02, 06 and 07 in FIG. 3, the samples produced by SA converge asymptotically to the set of globally optimum solutions with probability one. However, the annealing schedule required to guarantee convergence is impractically slow, so in practice, one runs the slowest tolerable schedule and hopes for a good sub-optimal solution.

An Exemplary Simmered Greedy (SG(N)) Partitioning

FIG. 4 shows the pseudo code for a preferred embodiment of the invention, simmered greedy optimization, i.e., SG(N). SG(N) is an iterative method that replaces the current solution with another chosen from the current neighborhood.

Here the replacement is chosen in four steps:

1. constructing a shortlist of destination clusters of a pre-determined size, containing highest scoring destination clusters for a current object;
2. picking randomly a destination cluster from said shortlist of destination clusters;
3. determining if said picked destination cluster is acceptable according to a probabilistic acceptance criteria at a current temperature, T, gradually decreasing said current temperature, T; and,
4. replacing said current clustering with said picked destination clustering, if said picked destination clustering is acceptable.

SG(N) represents a parameterized compromise in the fast hill climbing behavior of GR and the global searching of SA. SA can be closely approximated by setting the shortlist size N to infinity. And GR can be approximated by setting N to 1, and the temperature to 0.0. However as can be seen see in the Section hereinbelow, the best co-clustering performance is exhibited at N=1 with the annealing schedules used in SA. This is a very restrictive setting; only the least unfavorable state change from any current state is ever allowed.

It should be appreciated that simmered greedy partitioning can be applied to more than and other than solving a co-clustering problem, such as vector quantization, time tabling, scheduling and protein folding prediction.

The SG(N) procedure may use either a Boltzmann probabilistic acceptance or a simpler threshold function having equivalent performance. The computational cost is similar with either variant. It is contemplated that the use of the simpler variant for implementation in special-purpose hardware can be investigated.

SG(N), and particularly SG(1), is a highly effective optimization algorithm, allowing enough uphill and downhill moves to converge to better maxima than more localized greedy approaches.

In another embodiment of the invention, with its greedy bias, SG(N) applies SA to a dynamically discovered small region in the search space that is likely to contain good maxima. This dynamic restriction to a small region causes SG(N) to be an efficient optimization method.

In another embodiment of the invention, optimizations associated with SA are applied to SG(N). FIG. 3 presents pseudo-code for implementing generic SA. Implementations of SA typically use a fixed annealing schedule that starts at an initial preset high temperature value. With each cooling step, the temperature is multiplied by a fixed decay factor slightly less than 1.0, and the Markov chain Monte Carlo sampling, i.e., "MCMC," is run for a large fixed number of steps, enough for achievement of equilibrium to be at least plausible. Significant computational savings are achieved by applying the following approach:

1. Iterate through all the rows exactly once at each temperature instead of taking a large number of random samples at each temperature. Random sampling in generic SA is motivated by considerations of burn in to achieve equilibrium. This is important when MCMC sampling is applied to numerical integration, because the correct probability distribution must be sampled. But for optimization it is less important to produce the intended distribution at all temperatures, provided that the algorithm manages to sample the gross partition structure at the higher temperatures before sampling the finer partition structure is found at lower temperatures. By spending less time at each temperature, it is affordable to make smaller reductions of temperature at each cooling step.

2. Adapt the starting temperature to the data. During the first iteration over rows the temperature $T_1$ is set to infinity. During this iteration the maximum decrease in the objective function caused by a row move is recorded. The temperature $T_2$ for the second iteration is set to this maximum decrease value. The temperature is multiplied by a user-supplied temperature decay factor for subsequent iterations, i.e. $T_{n+1}$=TempDecay*$T_n$.

3. The final iteration is done by greedy optimization, with the temperature set to 0.

4. Finally, iteration is delayed over either rows or columns until the temperature is below a designated threshold. It has been found that when co-clustering to or from non-square co-occurrence matrices, the scales of objective function changes differ for rows and columns. The row and column thresholds are set by recording separate row and column decreases during iteration 1.

Exemplary Numerical Experiments

To confirm the improved performance of the invention, SG(N), implementations of co-clustering were run using GR, SA, DC and SG(N), on 15 co-occurrence count matrices of a wide variety of shapes and sizes. Each of these was co-clustered into 250×250 clusters.

To avoid dissimilarities in performance caused by differing underlying technologies, the methods and algorithms were implemented in C++. They were all compiled with g++ version 3.4.3 with flags "-fomit-frame-pointer-O3-ffast-math". The programs were run on a 2.5 GHz Xeon CPUs.

All the co-occurrence count matrices were derived from natural language corpora, most of which are publicly accessible. The corpora and co-occurrence count matrices are described in the following subsection, and the experiments comparing the algorithms on these datasets are reported in the subsequent subsections.

Evaluation Corpora and Testing Conditions

FIG. 5 shows a table, Table 1, of co-occurrences matrices used in evaluating performance of the method of the invention against other similarly related methods and algorithms. Table 1 summarizes the important features of the co-occurrence matrices used in the evaluations. Similar results were obtained from all of such corpora, hence it should be appreciated that the precise details of how a corpus is collected and tokenized are unimportant. It should be appreciated that enough information was provided to construct very similar, if not 100% identical corpora for confirmatory experiments.

Fifteen different co-occurrence count matrices were produced from ten different corpora. Except for matrix (12) in Table 1, the corpora were tokenized in a trivial manner using white space as token separators, and treating each punctuation mark as a separate token. Every such distinct token was assigned a row in the co-occurrence count matrix. For every such word token, the token to its immediate left, if any, and immediate right, if any, was taken to be a context token. Contexts on the left and right were taken to be distinct, i.e. a left/right marker was added to each context token. The co-occurrence matrix contains a column for every distinct context. For matrix (12), the rows are person names and the columns are organization names as determined by a named-entity recognition program. The counts record the number of times each pair co-occurred in the same document.

Five of the 15 co-occurrence matrices were produced by restricting other matrices to the most frequent terms, in order to produce smaller problems. Some algorithms required too much time or memory to complete the larger problems. Matrix (0) is related to (4) in this way, as are (3) and (7) to (11), (5) to (8), and (10) to (13).

Comparison of SG(1) with Greedy Optimization

Greedy optimization and greedy optimization with random restart represent standard combinatorial optimization algorithms. FIG. 6 shows a table, Table 2, of the benchmark of SG(1) against greedy with 20 random restarts, i.e., GR(20). A loop is one pass over rows and columns. Data is plotted in FIG. 7, a graph showing relative change in mutual information/achieved by using SG(1) in place of GR(2), GR with 20 random restarts. For each dataset, SG(1) (head of arrow) preserves more mutual information with fewer iterations than GR(20) (tail of arrow.) The vertical axis is normalized to mutual information achieved by GR(20). Data used is from Table 2. Table 2 compares SG(1) against greedy optimization with 20 random restarts (GR(20)). The mutual information of the solutions obtained is given in bits, and timing is given in the form of number of iterations through rows and columns, i.e. loops, to obtain convergence. The same data is shown graphically in FIG. 7. With 20 random restarts, GR makes roughly five times as many loops as SG(1), but in all cases SG(1) finds superior maxima. Such superiority is especially pronounced for the larger co-occurrence matrices.

Figures 8, 9:
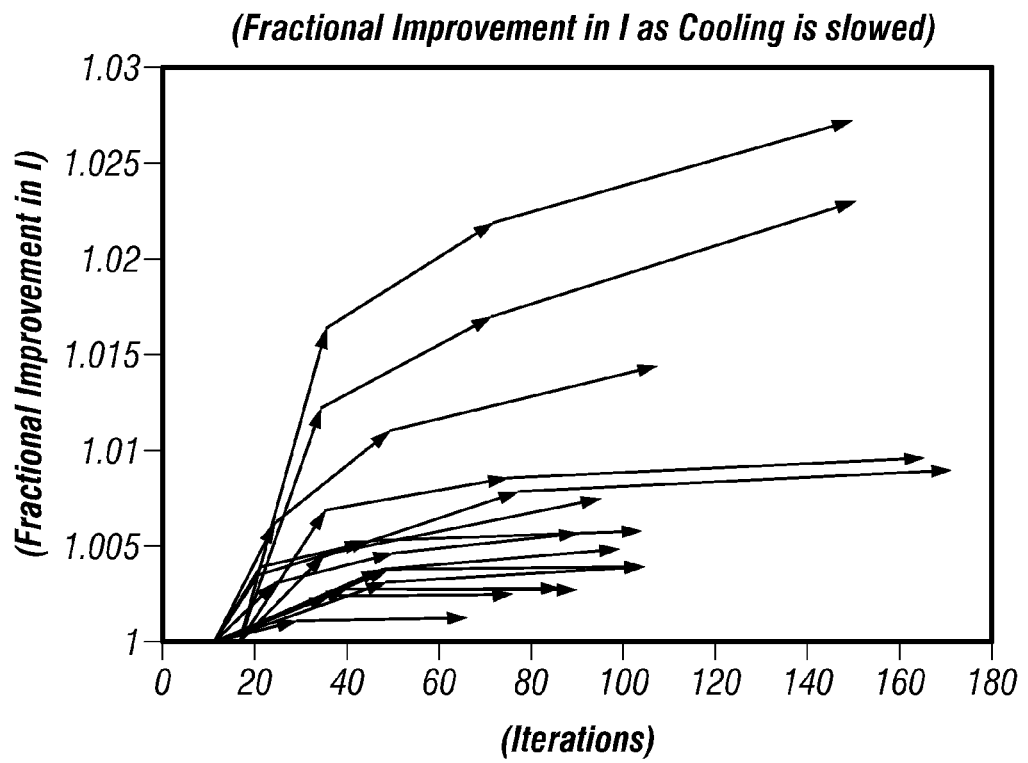
FIG. 8 shows a table of the effect on mutual information and number of loops as SG(1) temperature decay factor is varied according to the invention.
FIG. 9 shows a graph of data with the mutual information normalized to its value for TempDecay=0.5 according to the invention.

FIG. 8 shows a table, Table 3, of the effect on mutual information and number of loops as SG(1) temperature decay factor is varied according to the invention. A loop is one pass over rows and columns. Data is plotted in FIG. 9. Table 3 presents the effects of changing the SG(1) temperature decay factor. The number of temperature steps approximately doubles with each setting as TempDecay is set to 0.500, 0.7500, 0.8750, and 0.9375, and for most data sets, the resulting mutual information I steadily rises. This is the case in all but two of the 45 entries in this table. The mutual information decreased with the number of iterations for matrices 04 and 06 as TempDecay increased from 0.8750 to 0.9375, but only by less than 0.1%, as the performance was flattening out. This is far better than GR with random restarts for which, on average, 50.0% of the runs with double the number of loops would not increase mutual information.

FIG. 9 shows that data from Table 3, with the mutual information normalized to its value for TempDecay=0.5. FIG. 9 shows improvement in mutual information achieved (I, in bits) by SG(1) as cooling rate is slowed, for each dataset. The Data for this FIG. 9 is derived from Table 3 by normalizing/for each decay rate to that for Decay=0.5. This shows the relative increase in I, making clear the two cases of decreasing I are nearly imperceptible, and that some of the larger datasets would most likely benefit from further slowing of the cooling schedule.

SG (1) is no more complicated than GR with random restarts to implement. This makes GR the less sensible choice, even as a quick and easy expedient.

Comparison of SG(N) with SA

Figures 10, 11:
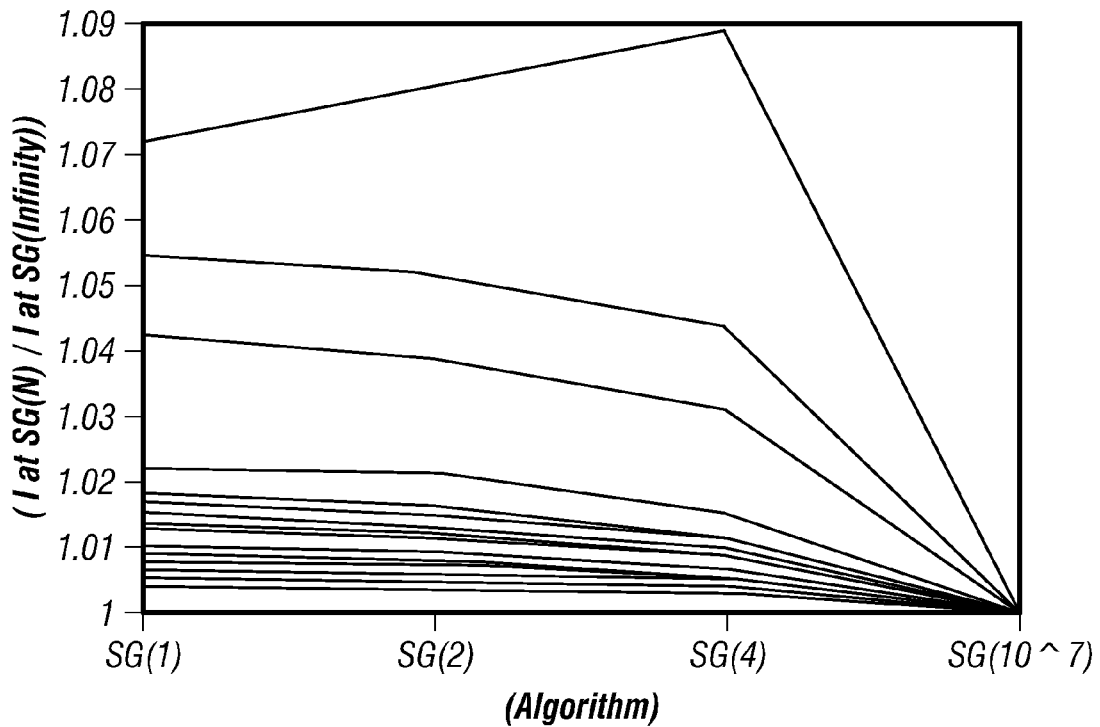
FIG. 10 shows a table of variation with the size N of a neighborhood (in other words, the size of the shortlist of destination clusters), of mutual information achieved and runtime for SG(N) according to the invention.
FIG. 11 shows a graph of variation with neighborhood size N of mutual information achieved and runtime for SG(N) according to the invention.

FIG. 10 shows Table 4, a table of variation with neighborhood size N of mutual information achieved and runtime for SG(N) according to the invention. The data is plotted in FIG. 11. SG(1) is generally superior in both runtime and performance. Table 4 lists the objective function values obtained by SG(N) as the row move neighborhood N is varied from 1 to (effectively) infinity. For infinity, $10^7$ has been used because such is greater than the number of rows or columns in any of the matrices studied. The SG ($\infty$) algorithm (column 5) is Simulated Annealing (SA). Using intermediate values of N (columns 3 and 4), allows smoothly varying the co-clustering approach between strict simmered greedy and simulated annealing.

It can be seen from the table that as neighborhood size is increased the clustering quality degrades. Out of the 45 table entries only two, i.e. ID 13, SG(2) and ID 13 SG(4), do not follow this trend. Although SA may converge to the global maximum for sufficiently slow annealing schedules, but for practically realistic schedules, SG(N) with N≈1 is better. It appears as such because it is not practical to sample a significant fraction of the possible clusterings, it is best to focus the search on a relatively small neighborhood of the optimal solution.

Comparison of SG(1) with the Algorithm of Dhillon et al (DC)

FIG. 12 shows a table, Table 5, of run times and mutual information achieved by SG(1) and the custom co-clustering algorithm of Dhillon et al according to the invention. ISD(N) refers to the use of N local post-processing steps as a final phase of the algorithm. Data is plotted in FIG. 13. Table 5 compares the runtime and performance of the algorithm of DC with SG(1). Such data is presented graphically in FIG. 13. The batch phase of the algorithm is referred to as ISD(0), and when followed by N local on-line steps it is referred to as ISD(N). These results show that ISD(N) requires run times over 1000 times longer than SG(1) to achieve comparable results.

Attempts were made to make the comparison in Table 5 as fair as possible. There was no unfair tuning of command-line parameters to optimize run-time or clustering quality. Default settings were used for SG(1) and the local search length was set to N for ISD(N). Both programs were in C++, and were compiled with the same compiler and optimization flags reported above and run on the same machine or identical machines. An attempt was made to fill out the table as fully as practically possible. The empty spaces in the ISD(N) columns correspond to runs that would have taken an unreasonable amount of time.

It appears that much of the difference in performance can be attributed to two innovations in ISD(N) that can do more harm than good. Such are: 1) the batch structure of the EM optimization and 2) the chains of first variations for escaping local maxima.

ISD(0) updates the count statistics for clusters in batch mode, i.e. after the cluster membership of all the rows or columns has been updated. SG(N) updates in on-line mode; the count statistics for clusters are updated every time a row or column changes cluster membership. On-line update often finds better maxima than batch update; this on-line superiority would be manifest in problems where there are some small clusters. It can be suggested that this is not the whole story. Co-clustering as opposed to clustering is generally applied to domains where the features are sparse. This implies that moving a row in or out of a cluster will often substantially change the profile of a cluster's counts even if the cluster is large. In other words, the distribution-space positions of most clusters in domains where co-clustering is likely to be used will be highly sensitive to the cluster membership.

Figures 13, 14:
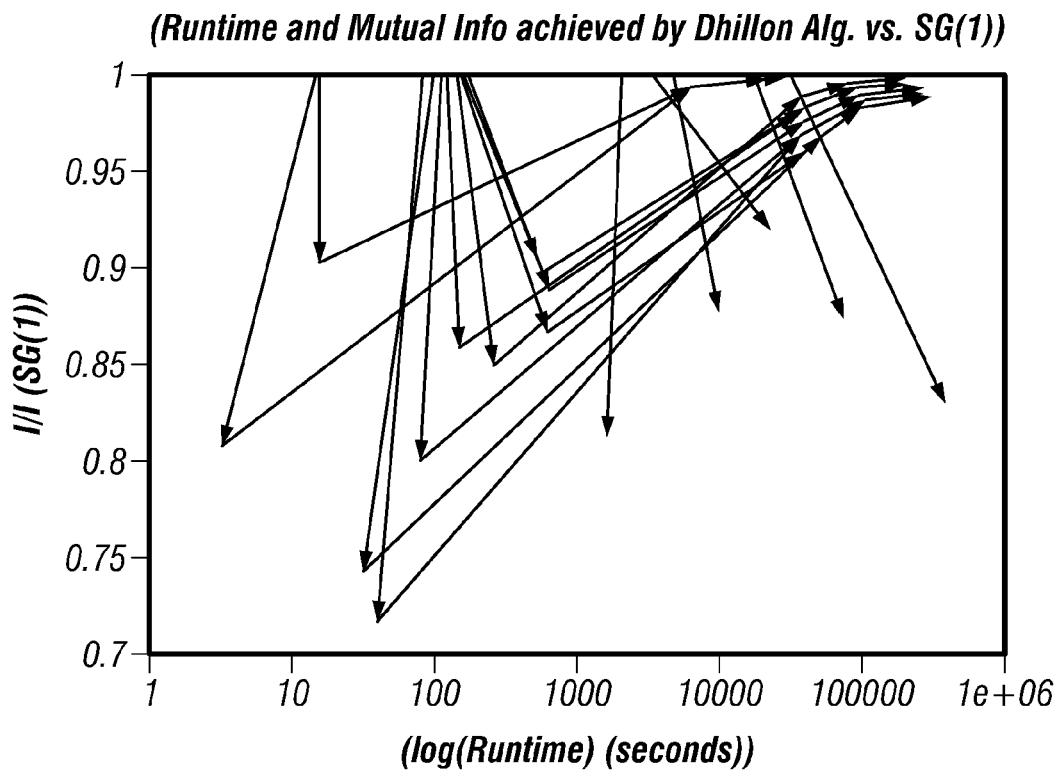
FIG. 13 shows a graph of run times and mutual information achieved by SG(1) and DC, according to the invention.
FIG. 14 shows a table of run times and mutual information achieved by SG(1) and DC, according to the invention.

On-line update is more computationally expensive than batch update, but the maxima found by greedy on-line search are so much better than those found by greedy batch search that on-line search gives better results faster. This is demonstrated by the data in Table 6 of FIG. 14 comparing the results of the batch-update ISD(0) to the on-line update GR(1). This Table 6 gives the Mutual information produced by batch greedy (ISD(0)) vs. on-line greedy (GR(1)) update of clustered co-occurrence matrix. FIG. 12 shows the table, Table 5, of run times and mutual information achieved by SG(1) and the custom co-clustering algorithm of DC. However, in the section, Incremental Update of Mutual Information, above, techniques are disclosed to reduce the computational cost of on-line update.

The local search phase is used to improve the mutual information after the batch phase has converged, escaping from a local maximum. While this is a reasonable thing to do, it is simpler and better to use local update throughout, and to use the annealing concept to encourage exploration on all scales, not just the finest scales as an afterthought. With SG(N) it is not required to do separate stages, to explore paths that begin with unfavorable moves. By combining and managing the production of uphill and downhill moves, the number of passes through the required data is reduced. Annealing constrains the row move selection to the expected objective function granularity at every stage of optimization. As with SA, a decaying temperature schedule allows initially fixing gross row assignments (perhaps noun and verb distinctions), before considering at later stages, finer level details (perhaps common nouns, proper nouns, action verbs, linking verbs, and auxiliary verbs.)

A new combinatorial optimization algorithm, Simmered Greedy Optimization (SG(N)), has been introduced. It has been demonstrated that it out-performs greedy optimization, greedy optimization with random restarts, and simulated annealing, as commonly practiced, in both computational demands and quality of solutions. The computational advantage is particularly pronounced, with speedup by factors around 1000 being typical, with improved solution quality. SG(N) was applied to the problem of co-clustering count matrices, but it is contemplated to have much wider applicability.

The "no free lunch" theorem argues that all black-box maximization algorithms perform exactly the same, when averaged over all possible cost functions. However in important problems it has been proven that the "no free lunch" theorem does not hold It should be appreciated that the results found and described herein strongly suggest that SG(N), and particularly SG(1), is highly effective on many data sets and optimization problems of practical interest, in a wide variety of domains.

Additionally SG(1) has very low memory requirements. It only requires memory to store the current solution. This fact together with the simplicity of the method makes it suitable for implementation in specialized hardware.

The method described herein uses the simplistic maximum likelihood method for estimating probability distributions from number counts. However, a full Bayesian treatment is superior.

The use of Dirichlet priors and the Evidence method to obtain improved point estimates of the distributions concerned, and their mutual information, have been experimented with and some effort has been made to account for the uncertainty in the distribution of the mutual information itself using the formulas for its variance and effort that might be improved using expressions for the tails of the posterior distribution of information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An article comprising a non-transitory machine-readable storage medium operable to cause one or more machines to result in operations comprising:
    arranging objects which are realizations of a first variable and a second variable into a current clustering to aid in solving a problem;
    constructing a shortlist of destination clusters, the shortlist containing a predetermined number, N, of destination clusters for a current object, each destination cluster associated with a score, each destination cluster in the shortlist having an associated score that is greater than an associated score of each destination cluster not in the shortlist;
    picking randomly a destination cluster from said shortlist of destination clusters;
    determining if said picked destination cluster is acceptable according to a probabilistic acceptance criteria at a current temperature, T, the current temperature representing an iteration of temperature out of a plurality of iterations of temperature from a first temperature to a second temperature;
    replacing said current clustering with said picked destination clustering, if said picked destination clustering is acceptable;
    repeating, at each iteration of temperature, the picking, the determining, and the replacing until no acceptable destination clusters from said shortlist of destination clusters remain;
    establishing said current clustering of objects as an output clustering,
    wherein said output clustering has a high confidence level of having a maximum of mutual information between said variables for predicting relationships between said variables; and
    outputting said output clustering for display to a user for use in solving said problem based on maximally predictive feature sets.

2. The article of claim 1, wherein a simulated annealing process is approximated by setting the predetermined number, N, to infinity.

3. The article of claim 1, wherein a greedy optimization process is approximated by setting the predetermined number, N, to 1 and by setting the current temperature, T, to zero.

4. The article of claim 1, further comprising:
    iterating through all objects exactly once at each temperature.

5. The article of claim 1, wherein:
    a first iteration of temperature occurs from the first temperature to a third temperature, the first temperature being set to infinity, the third temperature evaluated based on a change in a value of a function representing mutual information between the first variable and the second variable, and
    a final iteration of temperature occurs from a fourth temperature to the second temperature, the second temperature being set to zero.

6. The article of claim 5, wherein a subsequent temperature representing a subsequent iteration of temperature is evaluated by multiplying the current temperature:
    by a user-supplied temperature decay factor for subsequent iterations, such that $T_{n+1}=\text{TempDecay}*T_n$.

7. The article of claim 5, wherein the second temperature is set to zero in the final iteration so that said final iteration is performed by greedy optimization.

8. The article of claim 1, further comprising:
    separating said objects into almost independent dimensions to form a table comprising rows and columns; and,
    co-clustering said rows and columns of said table.

9. The article of claim 8, further comprising:
    delaying iteration over said rows or columns until said temperature is below a threshold value.

10. The article of claim 9, further comprising:
    setting a row and column threshold by recording separate row and column decreases during a first iteration.

11. The article of claim 1, wherein the score associated with each destination cluster represents a sum of joint probabilities of simultaneous occurrence of the first variable and the second variable.

12. An article comprising a non-transitory machine-readable storage medium operable to cause one or more machines to result in operations comprising:
    arranging objects into candidate solutions for a problem;
    constructing a shortlist of candidate solutions, the shortlist comprising a predetermined number of candidate solutions at the current optimization stage for a current object, each candidate solution associated with a score, each candidate solution in the shortlist having an associated score that is greater than an associated score of each candidate solution not in the shortlist;
    picking randomly a candidate solution from said shortlist of candidate solutions;
    determining if an application of said candidate solutions is acceptable according to a probabilistic acceptance criteria at a current temperature, the current temperature representing an iteration of temperature out of a plurality of iterations of temperature from a first temperature to a second temperature;
    replacing a current candidate solution with said picked candidate solution, if said picked candidate solution is acceptable;
    repeating, at each iteration of temperature, the picking, the determining, and the replacing until no acceptable candidate solutions from said shortlist of candidate solutions remain;
    establishing said current candidate solution as an output candidate solution wherein said output candidate solution has a high confidence level of
    having a maximum of utility for solving said problem; and
    outputting said output candidate solution for display to a user for use in solving said problem.

13. The article of claim 12, wherein a simulated annealing process is approximated by setting the predetermined number to infinity.

14. The article of claim 12, wherein a greedy optimization process is approximated by setting the predetermined number to 1 and by setting said temperature to zero.

15. The article of claim 12, further comprising: iterating through all of said objects exactly once at each temperature.

16. The article of claim 12, further comprising:
adapting a starting temperature to the iterative data, wherein said starting temperature is multiplied by a user-supplied temperature decay factor for subsequent iterations.

17. The article of claim 12, wherein said temperature is set to 0 in a final iteration so that said final iteration is performed by a greedy optimization process.

18. The article of claim 12, further comprising:
separating the object into almost independent dimensions.

19. The article of claim 18, further comprising:
delaying iteration over said almost independent dimensions until said temperature is below a dimension dependent threshold.

20. The article of claim 12, further comprising:
setting said dimension dependent threshold by recording separate dimension decreases during a first iteration.

* * * * *